Figure 1:
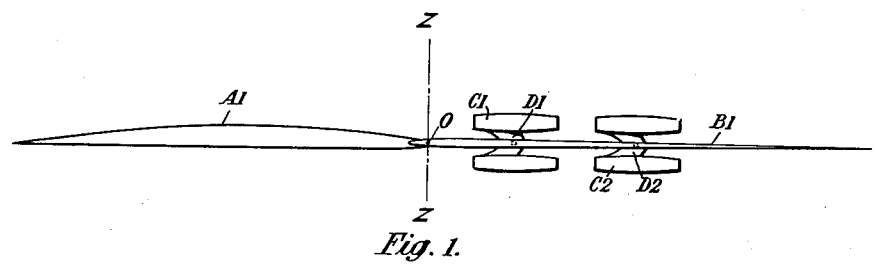

Jan. 31, 1961 B. N. WALLIS 2,969,938
VARIABLE SWEEPBACK AIRPLANE
Filed Sept. 16, 1957 2 Sheets-Sheet 1

Inventor
Barnes Neville Wallis
By Moses, Nolte & Nolte
Attorneys

Jan. 31, 1961   B. N. WALLIS   2,969,938
VARIABLE SWEEPBACK AIRPLANE
Filed Sept. 16, 1957   2 Sheets-Sheet 2

INVENTOR
BARNES NEVILLE WALLIS
BY
Moses, Nolte & Nolte
ATTORNEYS

United States Patent Office 2,969,938
Patented Jan. 31, 1961

2,969,938

VARIABLE SWEEPBACK AIRPLANE

Barnes Neville Wallis, Effingham, Surrey, England, assignor to Vickers-Armstrongs (Aircraft) Limited, London, England Filed Sept. 16, 1957, Ser. No. 684,001

Claims priority, application Great Britain Sept. 17, 1956

4 Claims. (Cl. 244—46)

The invention has for its object to provide improved means of control in jet-propelled aeroplanes having swept-back wings, and for this purpose it is proposed by the invention that the jet-units shall be mounted on the wings with their centres of pressure in advance of the flexural axes thereof and with capability of pivotal movement about axes which are substantially parallel to the OY and OZ axes of the aeroplane respectively, and that pilot-actuated means shall be provided for effecting such pivotal adjustments of the jet-units as will initiate forces effective to exert pitching, rolling or yawing moments upon the aircraft.

It is known that the critical speed at which the onset of flutter is experienced in the case of a swept-back wing can be increased very considerably by mounting a localised mass upon the wing at a suitable distance from the root, and it is preferred that advantage of such an arrangement should be taken in aeroplanes having the improved control means which characterise this invention, their jet-units being located with their mass-centres and the centres of pressure of the jet-tubes in advance of the flexural axes of the wings. This proposal—not in itself novel—is advantageous because it provides effective mass-balances by which the flutter speed can be raised and also permits reductions in the flexural and torsional rigidities of the wing structure, with corresponding saving in weight.

Furthermore, as will be seen from the following description, this disposition of the centres of pressure of the jet-units enables the power which is available for control to be augmented to a substantial degree by certain aero-elastic servo-effects upon the wings.

Considering a jet-propelled aeroplane having swept-back wings upon which the jet-units are mounted with their mass-centres and the centres of pressure of their jet-tubes in advance of the flexural axes of the wings, but abaft the centre-of-gravity of the aircraft as a whole, it will be seen that an alteration of the angular position of a jet-unit about an axis parallel to the OY axis of the aircraft will have a fourfold effect upon control in pitch, in that upward or downward force components will be exerted (a) by the changes in lift-force due to the favourable aero-elastic servo effect upon the wing of the aerodynamic forces acting upon the jet-unit in contra-distinction from the well-known unfavourable effects which are attributable to the use of trailing edge flap organs, (b) by the deflection of the mass-flow of intake air through the jet-tubes, (c) by the resultant thrust of the jet-units no longer being equal to the total drag, and (d) by an aerodynamic force due to the external air-flow over the deflected surfaces of the nacelle.

With jets idling, as when landing, the control effects (a) and (d), and to a reduced extent (b) remain available. Similarly, forces analogous to those described above are set up when the jet-units are rotated differentially in pitch for control in roll. For control in yaw the jet-units are rotated in azimuth, providing lateral forces corresponding to (b), (c) and (d).

A further feature of the invention consists in the provision of means for adjusting the angular positions of the jet-propulsion units so as to maintain their lines of thrust in alignment with the relative wind when the wing-sweep angle is altered. Where the wing-sweep angle is altered during flight, as in the aerodyne described in my United States Patent 2,915,261, such engine adjustment will be effected by automatic mechanism which will, however, be capable of being over-ridden by the pilot-actuated control mechanism.

Figure 2:
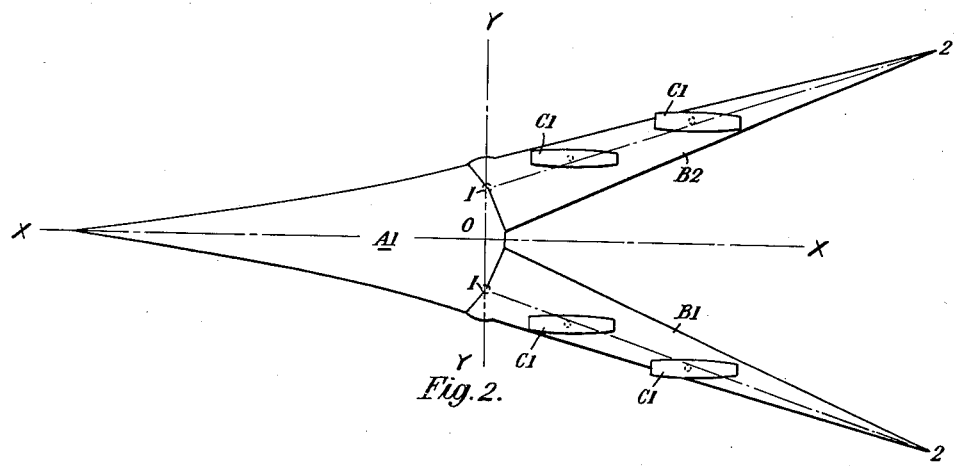
Figure 4:
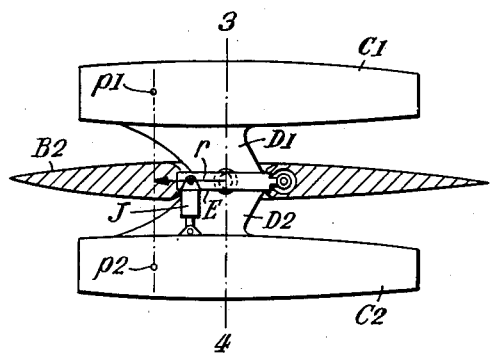
Figure 3:
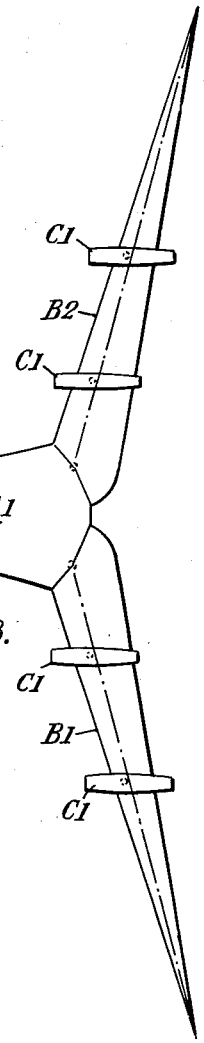
Figure 5:
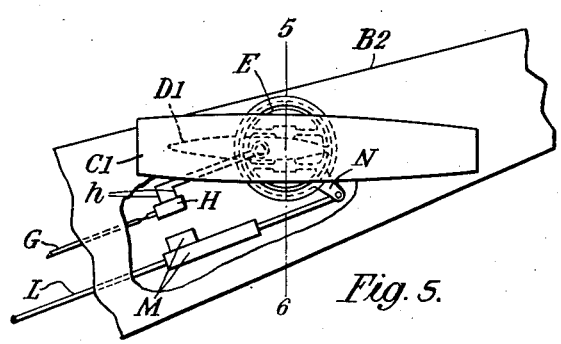

The manner in which the invention may be carried into effect is hereinafter more fully described with reference to the accompanying diagrammatic drawings. The application of the invention to an aeroplane such as is described in United States Patent 2,915,261, in which the sweep angle of the main-wings is adjustable in flight, is illustrated by Figs. 1 to 3 which are respectively a longitudinal elevation and a plan of the aeroplane with the main-wings in the swept-aft position for high-speed flight, and a plan in which the main-wings are shown outspread as for take-off and landing. Figs. 4 and 5 are respectively a vertical section and a plan of a jet-unit mounting shown separately.

In the invention, a forewing A1 of generally triangular shape or delta shape is pivotally connected at 1, 1 to swept-back main-wings B1, B2 for pivoting of the latter to variable sweep angles between the positions shown in Figs. 2 and 3. The jet-units are duplicated, being each constituted by a pair of sub-units C1 and C2 in vertically spaced relationship, having individual nacelles which are respectively disposed above and beneath the main-wings B1, B2 and supported by streamlined brackets D1, D2 in positions such that the mass-centres and the centres of pressure of the jet-tubes are situated in advance of the flexural axes of the main-wings which axes are indicated by the chain-dotted lines 1—2 in each case. Said brackets D1, D2 are carried in each case by a common bearing member E mounted in the wing structure so that it may be rotated therein about an axis 3—4 substantially parallel to the OZ axis of the aircraft. The brackets D1, D2 are further connected to said bearing member by transverse pivots the axis 5—6 of which is substantially parallel to the OY axis of the aircraft.

Referring to Figs. 4 and 5, it will be seen that the centres of pressure $p_1$, $p_2$ of the respective nacelles of the jet unit are situated in advance of the flexural axis of the wing by a distance $r$. Thus, if the jet-unit C1, C2 is rotated about the axis 5—6 in a clockwise direction as viewed in Fig. 4, so that each individual nacelle exerts a lift force F, the wing will be subjected to a clockwise moment equal to the product of the two lift forces and the dimension $r$; the resultant torsion of the wing increases the angle of incidence in the direction necessary to impart a bow-down pitching moment to the aircraft, as in (a) above, it being understood that the centre-of-pressure of the surface lies abaft the centre-of-gravity of the aircraft.

When the jet unit is adjusted in the manner described, additional lift forces are impressed on each nacelle due (i) to the deflection of the mass-flow of intake air through the jet tubes, as in (b) above, and (ii) to the deflection of the mass-flow of air over the outer surfaces of the jet-tubes, as in (d) above; such augmentation of the lift forces in each case is proportional to the angle through which the nacelles are deflected. Furthermore, since the resultant of the thrusts of the two jet-tubes is no longer equal to the total drag, there is an upward force component equal to the product of the thrust force and the sine of the angle of deflection, as in (c) above.

Powered means 10 are provided for rotating the duplicated jet-units of both wings in unison about the axis 5—6 for the purpose of executing control in pitch, or in opposite senses for control in roll. Such means are also provided for rotating the members E in the wings about the axis 3—4, for control in yaw. Trimming adjustments may be made by the same means in both cases.

The duplicated jet-units of both wings are rotated in unison about the axis 5—6 for the purpose of executing control in pitch by a push-pull link G which is connected to an actuator H. Said actuator H may include a hydraulic pump and a control valve to selectively regulate flow through pipes h connected to any suitable device, such as a jack J, and the arrangement is such that the extension and contraction of the jack results in a pivotal movement of the engine assembly about the axis 5—6. Operation of the jacks on both wings together effects control in pitch; control in roll is achieved by operating the jacks differentially. For control in yaw, i.e. about the axis 3—4, actuator M, which may be similar to that of Fig. 12 of Patent 2,915,261, is controlled to move lever N attached to the member E, so that the engine assembly is rotated in the required direction. When actuators M serve as a fixed link for adjusting the jets with movement of the wings, they may be connected to the wings, via a member L, as shown in Patent 2,915,261.

What I claim as my invention and desire to secure by Letters Patent is:

1. An aircraft having a fore-wing and a pair of swept-back wings, means for pivotally connecting said swept-back wings to said fore-wing for pivotal movement of the swept-back wings in azimuth between an outspread position for take-off and landing and a swept-aft position for high speed flight, at least one jet-propulsion unit mounted on each pivoted swept-back wing with its mass-center and center-of-pressure located in advance of the flexural axis of the wing, means for mounting said jet-units for pivotal movement about pivot axes which are substantially parallel to the OZ axis of the aircraft, and means for turning the jet-units relative to the wings about said pivot axes.

2. An aircraft according to claim 1, wherein the means for turning the jet-units comprises means for adjusting the angular positions of the jet-propulsion units during pivotal adjustment of the swept-back wings so as to maintain the thrust-lines of the jet-units in alignment with the relative wind and additional pilot-actuated means for turning the jet-units about their pivot axes.

3. An aircraft according to claim 1, said mounting means including at least one bearing member in each swept-back wing, and means for supporting said bearing members for pivotal movement in the wings about an axis substantially parallel to the OZ axis of the aircraft, brackets on each bearing member extending respectively above and below the wings, and a jet-tube and nacelle of a duplicate jet-propulsion unit being mounted on each bracket.

4. An aircraft comprising a fore-wing and two main wings, the fore-wing being of substantially delta-shaped plan-formation and the main wings extending from the ends of the base of the fore-wing, means pivotally connecting the main wings to the fore-wing so that the main wings are pivotable in azimuth between an outspread position for take-off and landing and a swept-aft position for high speed flight, at least one jet-propulsion unit mounted on each main wing with its mass-center and center-of-pressure located in advance of the flexural axis of the main wing, means for mounting said jet-units for pivotal movement about axes which are substantially parallel to the OZ axis of the aircraft, and means for turning the jet-units relative to the wings about their pivot axes.

References Cited in the file of this patent

UNITED STATES PATENTS

| | | |
|---|---|---|
| 2,677,931 | Prieto | May 11, 1954 |
| 2,734,698 | Straayer | Feb. 14, 1956 |
| 2,744,698 | Baynes | May 8, 1956 |
| 2,762,584 | Price | Sept. 11, 1956 |
| 2,793,826 | Fiedler | May 28, 1957 |

FOREIGN PATENTS

| | | |
|---|---|---|
| 554,084 | Great Britain | June 18, 1943 |
| 506,664 | Belgium | May 21, 1954 |